Sept. 8, 1931.  M. G. HILL ET AL  1,821,939
SHOE STIFFENER AND METHOD OF MAKING THE SAME
Filed Sept. 20, 1927

Patented Sept. 8, 1931

1,821,939

UNITED STATES PATENT OFFICE

MAURICE GODFREY HILL AND THOMAS HAMER BRISTOW, OF LEICESTER, ENGLAND, ASSIGNORS TO UNITED SHOE MACHINERY CORPORATION, OF PATERSON, NEW JERSEY, A CORPORATION OF NEW JERSEY

SHOE STIFFENER AND METHOD OF MAKING THE SAME

Application filed September 20, 1927, Serial No. 220,801, and in Great Britain October 29, 1926.

This invention relates to stiffening parts of boots and shoes and is herein set forth as embodied in a thermoplastic toe stiffener and a method of making the same.

A type of toe stiffener commonly used comprises an absorbent base, such as felt, impregnated with a thermoplastic substance,— that is, a substance which is normally hard but may be rendered soft and plastic by heat. Such a stiffener is incorporated in the upper of a shoe, heated either before or after its incorporation to render it soft and plastic, given its desired shape when the upper is conformed to the last and then permitted to cool and thereby return to its normal, hard condition. The thermoplastic substances, which are commercially available, such as mixtures of blown asphalt and colophony, do not possess a high degree of resilience and have a tendency to become brittle and to crumble during the wearing of the shoe.

The general object of the present invention is to provide a novel thermoplastic stiffener which shall have increased strength and resilience.

The invention relates to a stiffener comprising a base of absorbent sheet material impregnated with a mixture of finely divided resilient material and thermoplastic material. For example, the thermoplastic material may be colophony and the resilient material may be crumbed or shredded rubber or rubber composition, comprising from 5 to 10 per cent of the total. The rubber or rubber composition thus incorporated with the colophony in this relatively small percentage in no wise impairs the thermoplasticity of the stiffener but gives it increased resilience and toughness.

Referring now to the accompanying drawings.

Figure 1:
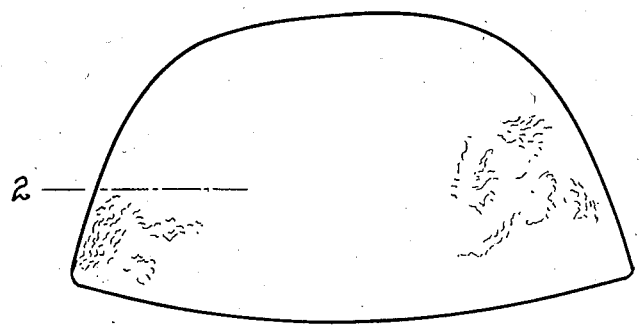
Fig. 1 is a toe stiffener in which the present invention is embodied.
Figure 2:
Fig. 2 is a cross-section on the line 2 of Fig. 1.

The illustrated toe stiffener comprises a base of fabric, such for example, as felt or cotton flannel, impregnated with a mixture of thermoplastic material and shredded rubber composition. The illustration of the two materials is purely empirical, the shredded or crumbed rubber composition being indicated by the short, wavy lines arranged at random. The thermoplastic material in the illustrated toe stiffener is a mixture of colophony and blown asphalt in about the proportions of 75 parts by weight of colophony to 25 parts of blown asphalt. The finely divided rubber composition is finely divided vulcanized scrap rubber such as tire treads or gas tubing. In the manufacture of the stiffener there is gradually incorporated in the molten thermoplastic material from 5 to 10% of crumbed scrap rubber. A strip of absorbent material is impregnated with this molten mixture and allowed to cool, after which the stiffeners are cut out of the impregnated material. The rubber or rubberized material thus incorporated with the thermoplastic material does not adversely affect the thermoplastic quality of the stiffener. At the same time it imparts to the finished box toe of the shoe an increased resilience and an increased resistance to collapsing when exposed to extreme climatic heat.

Although a particular manner of preparing the impregnating mixture has been described above and a particular form of rubber specified, similar results as regards the finished stiffener may be secured in other ways.

For example, a small quantity of colophony and vulcanized rubber may be dissolved in a volatile solvent, the solvent evaporated, and the dried residue finely divided and added to the molten thermoplastic material, which may be the mixture of colophony and blown asphalt referred to above or may consist entirely of colophony. Or again, the rubber may be amalgamated readily with the molten colophony if it be added in the form of latex. In this case, the addition must, of course, be slow inasmuch as the latex contains water; and preferably a concentrated latex containing a minimum of water is employed.

Having thus described our invention what we claim as new and desire to secure by Letters Patent of the United States is:

1. A stiffener for uppers of boots and shoes adapted to be softened by heat and conformed to the last at the same time as is the upper, said stiffener consisting of absorbent sheet material impregnated with a mixture comprising a large amount of thermoplastic substance and an amount of finely divided vulcanized rubber so small as to have substantially no effect upon the thermoplasticity of the stiffener but sufficient to make the stiffener more resilient than it otherwise would be.

2. A stiffener for uppers of boots and shoes adapted to be softened by heat and conformed to the last at the same time as is the upper, said stiffener consisting of absorbent sheet material impregnated with a mixture containing at least 80 per cent of a thermoplastic substance and a small amount of finely divided vulcanized rubber.

In testimony whereof we have signed our names to this specification.

MAURICE GODFREY HILL.
THOMAS HAMER BRISTOW.